May 4, 1954  D. FITCH  2,677,289
CHAIN SAW FILING FIXTURE
Filed May 15, 1952  2 Sheets-Sheet 1
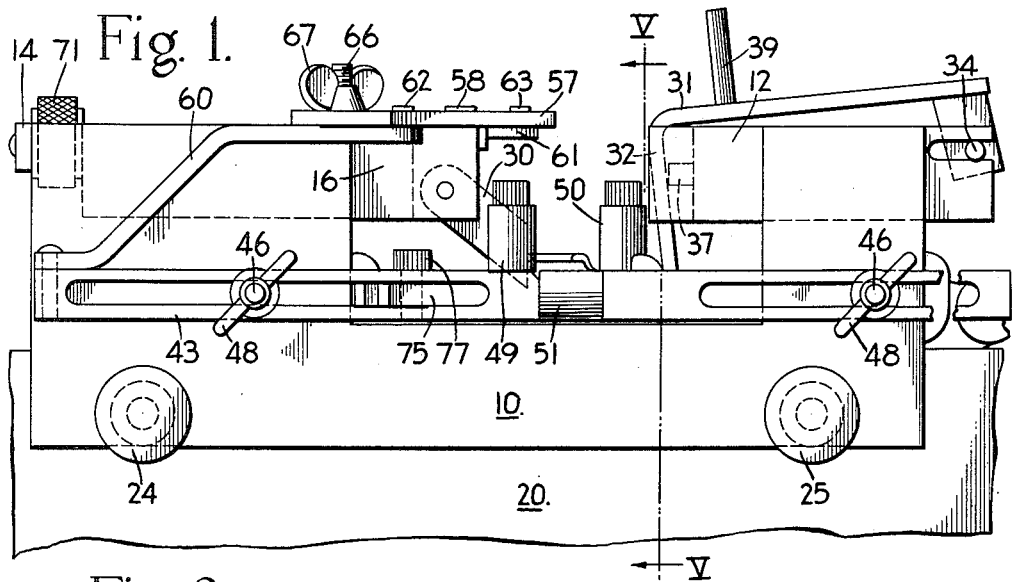
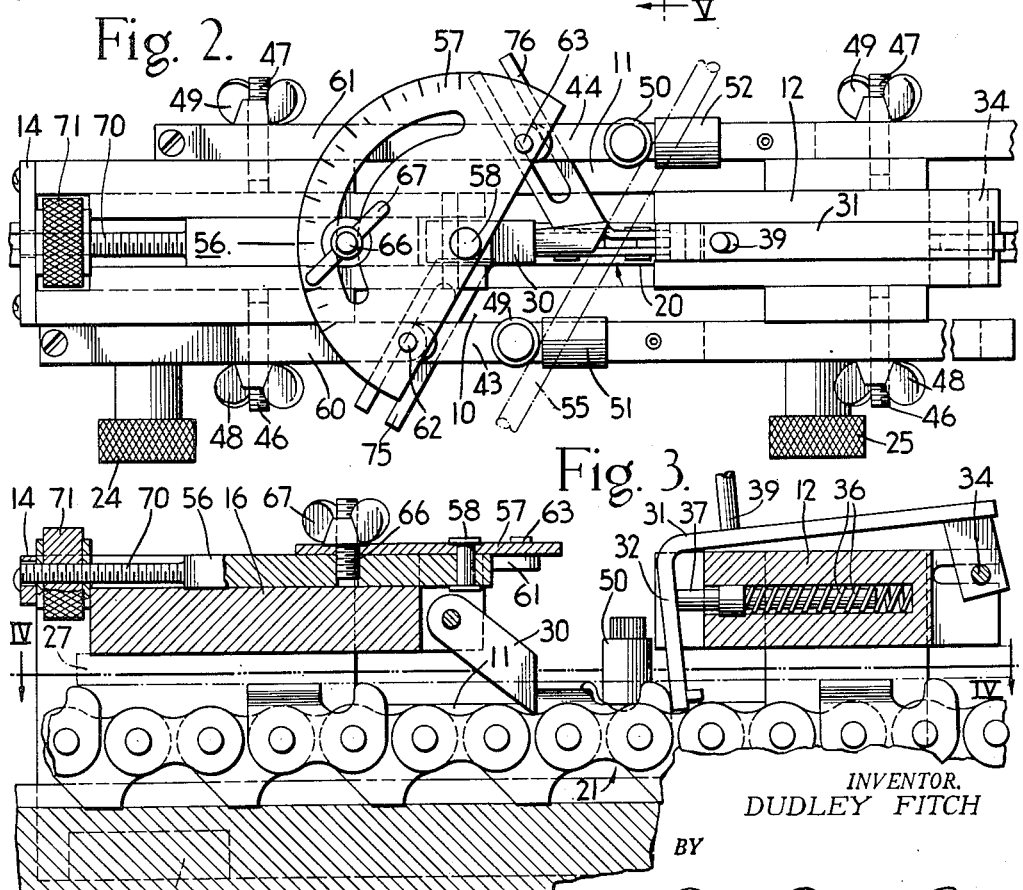
INVENTOR.
DUDLEY FITCH
BY
Bean, Brooks, Buckley & Bean.
ATTORNEYS May 4, 1954 D. FITCH 2,677,289
CHAIN SAW FILING FIXTURE
Filed May 15, 1952 2 Sheets-Sheet 2

INVENTOR.
DUDLEY FITCH
BY
Bean, Brooks, Buckley & Bean.
ATTORNEYS

Patented May 4, 1954

2,677,289

UNITED STATES PATENT OFFICE 2,677,289

CHAIN SAW FILING FIXTURE

Dudley Fitch, Ransomville, N. Y.

Application May 15, 1952, Serial No. 287,867

4 Claims. (Cl. 76—31)

This invention relates to a fixture for use in filing the cutting edges of the teeth of chain saws or other saws having a similar tooth form.

In the prior art many forms of apparatus have been proposed for the general purpose of sharpening chain saw teeth. Such apparatus has generally involved power driven grinding wheels, usually with the periphery of the grinding wheel specially formed to follow the desired curvature of the cutting edge of the chain saw tooth. Of course, such apparatus is somewhat elaborate and expensive to provide and its use has therefore been limited to establishments which more or less make a business of sharpening devices of this general class. Not only is the cost of grinding wheel apparatus of this general type prohibitive as far as individual chain saw users are concerned, but such apparatus also generally requires special skill not ordinarily found in the average chain saw user.

The present invention provides a fixture for use in hand filing the cutting edges of chain saw teeth and provides a device which may be used by operators with a minimum of familiarity with machinery or machine tools but which still gives accurate and fully satisfactory sharpening results in the hands of inexperienced users. The fixture of the present invention provides means for supporting a chain saw and for indexing the teeth thereof along the fixture for successive tooth filing operations. The fixture further provides means for accurately guiding a hand file for actually sharpening the chain saw tooth edges.

The indexing means is flexible in its nature in that it automatically indexes or gauges a successive series of chain saw teeth regardless of the pitch of the teeth without special adjustment or setting up. Further, the fixture is such that the angle at which the file is guided to operate may be readily adjusted and may be readily reversed since the teeth of chain saws of the kind herein chiefly contemplated are generally alternately reversed.

The specific example of the fixture of the present invention which is illustrated in the accompanying drawings and described in detail in the following specification is adapted particularly for the filing of chain saw teeth wherein the cutting edge is an arcuately extending chisel edge lying generally along the line of travel of the chain saw. In this particular application the filing is most effectively accomplished by the use of a circular file although the principles of the present invention contemplate the use of other forms of files when dealing with other tooth cutting edge contours.

Various modifications may be made in the apparatus without departing from the general principles of the invention, but a single specific embodiment is illustrated in the drawings and described in detail in the following specification by way of example. It is to be understood, however, that the principles of the invention are not limited to the particular mechanical embodiment illustrated and described, and that the scope of the invention is limited only as defined in the appended claims.

In the drawings Fig. 1 is a general side elevational view of one form of the apparatus of the present invention;

Fig. 2 is a general top plan view thereof;

Fig. 3 is a fragmentary longitudinal cross-sectional view of the apparatus of Figs. 1 and 2 taken substantially centrally and on a vertical plane;

Figure 4:
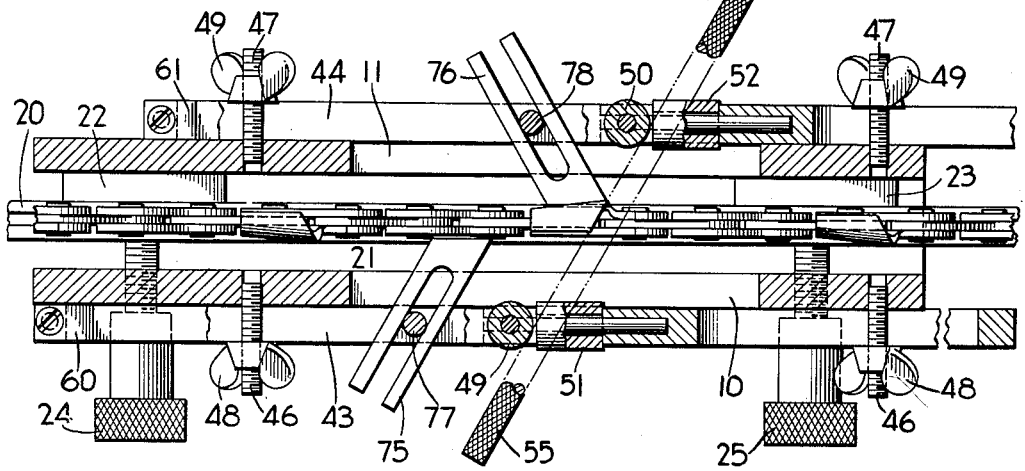
Fig. 4 is a longitudinal cross-sectional view taken approximately on the line IV—IV of Fig. 3.

Like characters of reference denote like parts throughout the several figures of the drawings and the numerals 10 and 11 designate a pair of opposed side plates. At the right-hand end of the fixture as viewed in Figs. 1 through 4 the side plates 10 and 11 are provided with upward extensions which are fixed to a central block 12 which cooperates with side plates 10 and 11 to form, in effect, an inverted U-shaped framing member.

At the left-hand end as viewed in Figs. 1 through 4 the side plates 10 and 11 are similarly upwardly extended and a plate 14 is fixed to the plates 10 and 11 at the end of the fixture to maintain the plates 10 and 11 in spaced parallel relation.

A block 16 is fixed between the left-hand upward extensions of side plates 10 and 11 to likewise form an inverted U-shaped framing portion, and it will be noted from Fig. 3 that the bottom surfaces of blocks 12 and 16 lie generally in the same horizontal plane.

Figure 5:
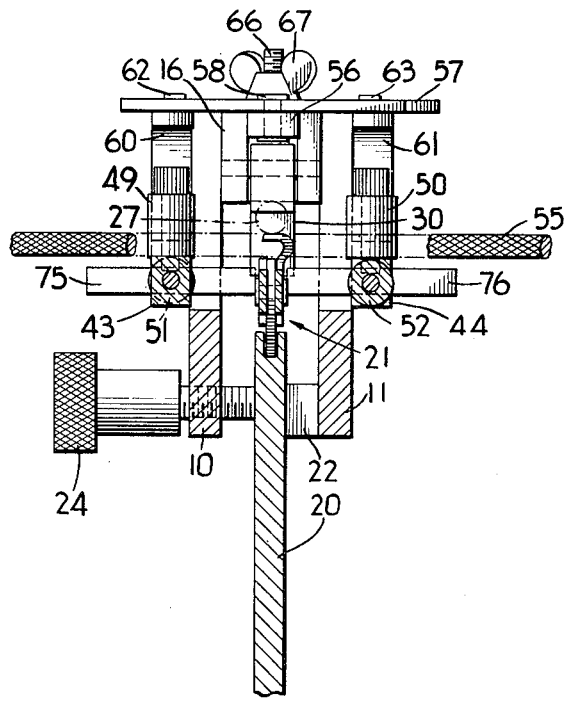
Fig. 5 is a cross-sectional view on the line V—V of Fig. 1.

Chain saws of the kind herein contemplated comprise, in addition to the saw tooth chain itself, a pair of supporting sprockets and a guide plate which is coplanar with the sprockets and lies between them. The guide plate is provided with grooves in its opposite longitudinal edges which receive and guide tail portions of the individual teeth of the chain saw and thus not only guide those teeth but back them up in the actual sawing of timber. In the fixture of the present invention it is contemplated that the chain saw be sharpened in position on such guide plate and in Fig. 5 the chain saw guide plate is designated 20 with a chain saw element designated generally 21 supported in the edge groove of guide plate 20.

The lower inner surface of side plate 11 is provided, in the present instance, with a longitudinally spaced pair of blocks 22 and 23 and the opposing portions of side plate 10 are provided with clamp screws 24 and 25. Guide plate 20 is thus clamped in the position shown in Fig. 5 to support the chain saw teeth in proper position for filing. In setting up a guide plate and chain assembly in the fixture of the present invention, it is preferred to employ a gauge bar or rod which is indicated in dot and dash lines at 27 in Fig. 5. As there shown, gauge rod 27 has its upper peripheral surface lying against the bottom surfaces of blocks 12 and 16 and its bottom peripheral surface is in contact with and gauges the top surfaces of the chain saw teeth. With the gauge rod and the chain saw thus positioned, the screws 24 and 25 are tightened to properly lock the work for filing of the chain saw teeth.

It will be noted that this clamping action positions guide plate 20 rigidly with respect to the fixture generally and that when gauge rod 27 is removed, by longitudinal sliding movement, the chain itself is free to slide along its guiding groove in the upper edge of guide plate 20. Indexing means are provided for locating and holding individual teeth of the chain saw in position for filing.

An indexing pawl 30 is pivotally mounted in a bifurcation formed in the right-hand end of block 16 as viewed in Figs. 1 and 3. Block 12 at the right-hand end of the fixture is provided with a resiliently mounted bracket 31 which has a depending arm portion 32 which cooperates with indexing pawl 30 to properly locate a chain saw tooth longitudinally for sharpening as clearly shown in Figs. 2 and 3, particularly in the latter.

Bracket 31 is mounted for pivotal and sliding movement relative to block 12 by means of a pin 34 which is fixed to the right-hand end of bracket 31 and slides in opposed slots in the corresponding end of block 12.

A compression coil spring 36 is housed in a longitudinal opening in block 12 and urges a pressure pin 37 to the left as viewed in Fig. 3 to similarly yieldably urge the depending arm portion 32 of bracket 31. A chain saw tooth is thus resiliently held against the rigid stop formed by indexing pawl 30. Bracket 31 is provided with a handle pin 39 which may be manipulated to raise bracket 31 to release a given chain saw tooth and permit the chain to be moved to the right as viewed in Fig. 3 until pawl 30 drops behind the next chain saw tooth which is to be sharpened.

Means are further provided for guiding a sharpening file and such means are readily adjustable for filing the teeth at selectively variable horizontal angles as well as for reversing the file direction in a horizontal plane, since alternate teeth of conventional chain saws of the kind hereunder consideration are reversed with respect to adjacent teeth. The file guiding means and the adjusting means, therefore, comprises primarily a pair of longitudinally adjustable bars or rails 43 and 44 which are disposed at the opposite exterior sides of plates 10 and 11 and are provided with longitudinal slots which engage pairs of outwardly projecting threaded studs 46 and 47, respectively, whereby the bars 43 and 44 are mounted for longitudinal sliding movement against plates 10 and 11. Wing nuts 48 and 49 associated with studs 46 and 47 provide means for manually locking of the rails 43 and 44 with respect to the side plates 10 and 11.

The file guiding means proper comprise vertical rollers 49 and 50 mounted for free rotation on rails 43 and 44, respectively, and horizontal rollers 51 and 52 which are, in the present instance, interposed in interruptions in the rails 43 and 44, the horizontal rollers 51 and 52 forming, in effect, intermediate rotatable continuations of rails 43 and 44. As shown in Fig. 4, a hand file 55 resting downwardly against horizontal rollers 51 and 52 and laterally against vertical rollers 49 and 50 is thus guided for lengthwise filing movement to sharpen the arcuate cutting edge of a chain saw tooth of the conventional type shown in the several figures of the drawing.

Means are provided for adjusting the rails 43 and 44 lengthwise of the fixture either as a unit or by reverse movement of the rails to reverse the filing angle. To this end a bar 56 is mounted for guided longitudinal movement in a guideway provided in the upper portion of block 16 and a quadrant plate 57, in the present instance semicircular, is pivoted to bar 56 as at 58. A pair of links 60 and 61 have pivotal connection at one end of each with rails 43 and 44, respectively, and are pivoted at their opposite ends to quadrant plate 57 as at 62 and 63, respectively. The pivotal connections of links 60 and 61 are on vertical axes so that swinging movement of quadrant plate 57 on its pivot 58 produces reverse longitudinal sliding movement of the rails 43 and 44. In the form shown, quadrant plate 57 is provided with angular protractor graduations which read against a reference mark on bar 56 so that the angle of guided movement of the file 55 may be directly set thereby. A vertical stud 66 carried by bar 56 extends through an arcuate slot in quadrant plate 57 and the latter is locked in angularly adjusted position by means of a wing nut 67 with which stud 66 is provided.

As previously mentioned briefly, rails 43 and 44 may also be adjusted lengthwise of the fixture as a unit to adjust the depth of attack of the file relative to a given saw tooth. The longitudinally slidable bar 56 which supports quadrant 57 has a threaded longitudinal extension 70 at its left-hand end as viewed in Figs. 2 and 3 and a thumb nut 71 which engages about threaded extension 70 is restrained against lengthwise movement by plate 14 at one side and by the adjacent end of block 16 at the other side. Plate 14 has a central aperture through which threaded extension 70 may project and accordingly rotative adjusting movement of thumb nut 71 moves block 56 longitudinally in either direction to give bodily adjustment to the pair of bars 43 and 44 and consequent longitudinal adjustment of the file guiding rollers 49 through 52 as a unit.

Means are provided for giving lateral support to the chain saw in the vicinity of the tooth being filed and such means comprise a pair of forked bars 75 and 76 which are disposed in the slots of bars 43 and 44, respectively, and which are adjustable toward and away from the chain saw by loosening screws 77 and 78 which thread into the lower portions of the bars 43 and 44, as shown in Figs. 1 and 4, particularly the latter.

I claim:

1. A chain saw filing fixture including a longitudinal body member and means for engaging and supporting a chain saw lengthwise thereof, file guide means at each side of said fixture to guide a file transversely thereof for filing a tooth of a chain saw supported therein, a support for said file guide means and file guide mounting means pivoted to said support upon a vertical axis through the longitudinal center line of said fixture for moving the file guide means at each side of said fixture longitudinally in opposite directions to adjust the angle of filing by pivotal movement of said mounting means, and means for moving said support means longitudinally of said fixture as a unit with said file guide mounting means to adjust the depth of filing.

2. A chain saw filing fixture including a body member and means for engaging and supporting a chain saw relative thereto, file guide means at opposite sides of said fixture to guide a file transversely with respect to said chain saw for filing a tooth thereof, a support for said file guide means and file guide mounting means pivoted to said support upon a vertical axis for moving the file guide means at each side of said fixture longitudinally of said chain saw in opposite directions to adjust the angle of filing by pivotal movement of said mounting means, and means for moving said support means longitudinally of said chain saw as a unit with said file guide mounting means to adjust the depth of filing.

3. A chain saw filing fixture including a longitudinal body member and means for engaging and supporting a chain saw lengthwise thereof, file guide means at each side of said fixture to guide a file transversely thereof for filing a tooth of a chain saw supported therein, gauge means engageable with successive teeth of said chain saw to locate the same longitudinally relative to the file guide means, a support for said file guide means and file guide mounting means pivoted to said support upon a vertical axis through the longitudinal center line of said fixture for moving the file guide means at each side of said fixture longitudinally in opposite directions to adjust the angle of filing by pivotal movement of said mounting means, and means for moving said support means longitudinally of said fixture as a unit with said file guide mounting means to adjust the depth of filing.

4. A chain saw filing fixture including a longitudinal body member and means for engaging and supporting a chain saw lengthwise thereof, file guide means at each side of said fixture to guide a file transversely thereof for filing a tooth of a chain saw supported therein, a support for said file guide means, and file guide mounting means pivoted to said support upon a vertical axis through the longitudinal center line of said fixture for moving the file guide means at each side of said fixture longitudinally in opposite directions to adjust the angle of filing by pivotal movement of said mounting means.

References Cited in the file of this patent

UNITED STATES PATENTS

| Number | Name | Date |
|---|---|---|
| 801 | Harris | June 21, 1838 |
| 189,534 | Walsh | Apr. 10, 1877 |
| 424,724 | Penrose | Apr. 1, 1890 |
| 434,071 | Powell | Aug. 12, 1890 |
| 758,551 | Merwine | Apr. 26, 1904 |
| 924,134 | Blankenburg | June 8, 1909 |
| 1,223,191 | Merritt | Apr. 17, 1917 |
| 2,083,586 | Woodbury | June 15, 1937 |
| 2,171,169 | Woodbury | Aug. 29, 1939 |
| 2,339,509 | Olson | Jan. 18, 1944 |
| 2,589,165 | Toy et al. | Mar. 11, 1952 |
| 2,594,821 | Stone et al. | Apr. 29, 1952 |

FOREIGN PATENTS

| Number | Country | Date |
|---|---|---|
| 455,128 | Canada | Mar. 15, 1949 |